United States Patent [19]

Jüntgen et al.

[11] 4,233,117
[45] Nov. 11, 1980

[54] MANUFACTURE OF ABRASION-RESISTANT COKE

[75] Inventors: Harald Jüntgen; Karl Knoblauch, both of Essen; Josef Degel, Hattingen; Dieter Zündorf, Essen; Klaus Giessler, Gelsenkirchen, all of Fed. Rep. of Germany

[73] Assignee: Bergwerksverband GmbH, Essen, Fed. Rep. of Germany

[21] Appl. No.: 939,376

[22] Filed: Sep. 5, 1978

Related U.S. Application Data

[63] Continuation of Ser. No. 806,931, Jun. 20, 1977, abandoned.

[30] Foreign Application Priority Data

Jun. 18, 1976 [DE] Fed. Rep. of Germany ....... 2627479

[51] Int. Cl.$^3$ .................... C10B 47/20; C10B 47/30; C10B 53/08; C10B 57/00
[52] U.S. Cl. ........................................ 201/6; 201/21; 201/23; 201/32; 201/42; 264/29.3; 264/29.6
[58] Field of Search ................... 201/6, 21, 23, 32, 33, 201/42; 264/29.3, 29.6; 202/131, 136, 218

[56] References Cited

U.S. PATENT DOCUMENTS

| | | | |
|---|---|---|---|
| 1,870,901 | 8/1932 | Derby | 202/136 |
| 1,950,017 | 3/1934 | Zwoyer et al. | 201/21 |
| 2,314,641 | 3/1943 | Wolf | 201/6 |
| 2,556,154 | 6/1951 | Kern | 201/6 |
| 2,575,587 | 11/1951 | Davies | 202/136 |
| 2,792,339 | 5/1957 | Rich | 202/136 |
| 3,043,753 | 7/1962 | Destremps et al. | 201/42 |
| 3,171,720 | 3/1965 | Shea et al. | 201/42 |
| 3,637,464 | 1/1972 | Walsh et al. | 201/6 |
| 3,700,564 | 10/1972 | Willibald et al. | 201/6 |
| 3,838,988 | 10/1974 | Sanada et al. | 201/6 |

*Primary Examiner*—Bradley R. Garris
*Attorney, Agent, or Firm*—Michael J. Striker

[57] ABSTRACT

Bodies are press-molded from a mixture of particulate fuel and a binder. These bodies are heated to a temperature between about 600°–900° C. in a rotary furnace to degas them. The degassing is carried out without subjecting the bodies to mechanical stresses and without permitting combustion of the expelled volatile gases. The resulting shaped coke has a greatly improved abrasion resistance.

7 Claims, 2 Drawing Figures

MANUFACTURE OF ABRASION-RESISTANT COKE

This is a continuation of application Ser. No. 806,931, filed June 20, 1977, now abandoned.

BACKGROUND OF THE INVENTION

The present invention relates to abrasion-resistant coke.

More particularly, the invention relates to a method of making abrasion-resistant coke, especially coke for use in adsorbing sulfur oxides from waste gases, and a rotary furnace for carrying out the method.

Industrial waste gases often contain sulfur oxides. These are ecologically harmful and should not be emitted into the atmosphere. Such emission can be avoided by removing the sulfur oxides from the gases prior to venting of the same.

It has been proposed to effect the removal of the sulfur oxides by adsorbing them on shaped coke. Such coke is manufactured by mixing particulate, non-caking fresh or fossil fuel (having a particle size which is 100% below 1.0 mm, preferably below 0.1 mm) with about 15–35% by weight of a binder (such as bitumen, tar or pitch), forming shaped coke bodies from the resulting mixture, and outgassing these bodies at temperatures of about 700°–900° C. Non-coking fuels suited for this purpose include charcoal, oxycoal, oxycoke and peat coke.

The finished coke is then used in a desulfurizing installation in which it is first placed into an adsorber. After the coke has adsorbed all the sulfur oxides and sulfuric acid it can accept, it is transferred to a desorber where it is regenerated in preparation for a new adsorbing cycle.

During the transportation into and out of the adsorbers and desorbers the coke is subjected to a substantial amount of mechanical stress, especially abrasion. A problem encountered in this connection—and heretofore unsolved—is that the known coke does not have the requisite hardness to successfully withstand the abrasion. As a result, there is a substantial amount of coke loss due to abrasion; this, of course, considerably increases the operating expenses of the installation.

SUMMARY OF THE INVENTION

It is, therefore, an object of the invention to overcome the prior-art shortcomings.

More particularly, it is an object to provide an improved method of making shaped coke which will result in a coke of greater hardness and abrasion-resistance than before.

Another object is to provide such a method which, although it somewhat increases the costs of manufacturing the coke, results ultimately in significant savings due to the elimination (or at least drastic reduction) of abrasion-caused coke losses.

Still another object is to provide an improved rotary furnace (kiln) for carrying out the novel method.

In keeping with these objects, and with others which will become apparent hereafter, one feature of the invention resides in a method of making abrasion-resistant shaped coke, particularly coke for use in adsorbing sulfur oxides from waste gases. Briefly stated, the method comprises forming a mixture of particulate solid fuel and of between 5–35% by weight thereof of a binder for the fuel, converting the mixture into shaped bodies, and outgasing the shaped bodies at between about 500°–900° C. to convert them into coke bodies, the step of outgassing comprising heating the shaped bodies to a temperature of between about 500°–700° C. while preventing the ignition of the expelled gases and protecting the bodies against exposure to significant mechanical stresses.

Coke produced in accordance with the novel method has between 0.5–3% by weight of volatile contents and exhibits a substantially higher abrasion-resistance than what is known from the prior art.

As indicated earlier, the novel method does involve somewhat of an increase in the cost of manufacturing the coke. This is so because the invention provides that the rotary furnace in which the shaped bodies are degassed, is heated only from its exterior; according to the prior art the driven-off volatiles were ignited in the coking oven by admitting oxygen thereto. This, of course, resulted in supplemental heating which was effectively free of cost and thus permitted somewhat lower manufacturing costs to be obtained for the coke. The invention deliberately avoids this initial economy in order to obtain a harder, more abrasion-resistant coke and, consequently, a subsequent greater cost economy in terms of significantly reduced abrasion losses.

The improved results which are obtained with the present method are surprising, since there has been no indication that the elimination of the volatiles burn-off during degassing would result in a harder, more abrasion-resistant coke.

To be certain of effectively avoiding ignition of the inherently readily ignitable expelled volatiles, it has been found advisable to flush the degassing furnace with inert gas so as to maintain the oxygen content in the free oven space at all times below 5% by volume.

Furthermore, it has been found that if the desired improvement in the abrasion-resistance of the coke is to be achieved, the degassing must take place under conditions in which the coke is subjected to little or no mechanical stress; this avoids e.g. the formation of cracks in the shaped bodies during their conversion into coke. Particularly suitable for carrying out the degassing operation under such no-stress conditions is a rotary furnace having no interior components that impact and/or entrain the shaped bodies. Such a furnace should preferably rotate at a speed of between 1–6 RPM, advantageously 3–4 RPM, because it has been found that higher speeds of rotation (and the constant mixing of the charge of shaped bodies which results e.g. from mixing and entraining components—such as baffles—in the furnace) will cause the production of a coke having lower resistance to abrasion.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
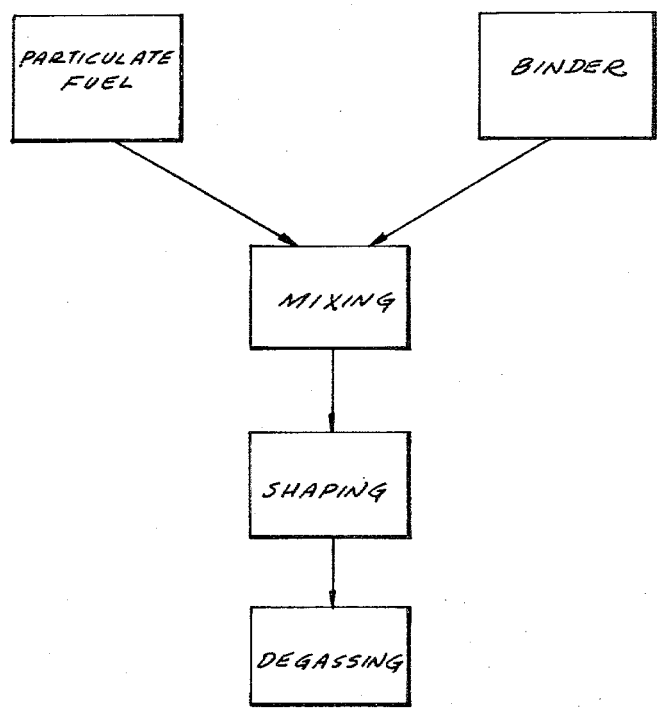
FIG. 1 is a flow diagram which schematically illustrates the steps of the invention.

In accordance with the invention, and as shown in FIG. 1, particulate combustible fuel is provided in form of fresh or fossil fuel. The particle size of the fuel is completely below 1.0 mm, i.e. 100% of the fuel has a particle size smaller than 1.0 mm. Preferably 90% of the fuel should have a particle size below 90μ, and even more preferably 80% of the fuel should have a particle size below 60μ.

A requisite quantity of this fuel is mixed with about 5–35% by weight of a binder, such as bitumen, tar, pitch or synthetic plastic material. The resulting mixture is then shaped (the equipment for this is known per se and requires no explanation) to form shaped, so-called "green" bodies. Thereafter, these bodies are degassed at temperatures of about 500°–900° C. According to the invention the degassing is carried out without permitting the liberated volatiles to become ignited. Furthermore, it is carried out in a rotary furnace until a temperature of about 500°–700° C. is reached and without subjecting the bodies to significant mechanical stresses.

Figure 2:
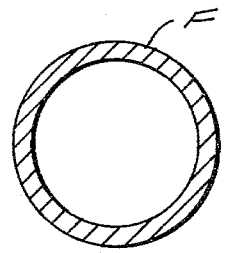
FIG. 2 is a diagrammatic cross-section through a rotary furnace for use in carrying out the novel method.

FIG. 2 shows, in a very diagrammatic illustration, a cross-section of a rotary furnace F for carrying out the invention. No details of the furnace construction or the manner in which the furnace is rotated, are given because these are known per se. What is important is that, as shown, the interior of the furnace is completely free of such components as baffles or the like which are conventionally provided to entrain and mix the furnace charge. This assures that (due to the absence of such entraining and mixing) the bodies are not subjected to any significant mechanical stresses during their conversion into coke.

The invention will now be described on hand of several examples for a better understanding.

EXAMPLE 1

A mixture was formed containing 150% by weight of particulate coal having a 35% volatile content and a heat value of 7702 Cal/g and of 45% by weight of bitumen as a binder. All of the coal had a particle size below 1.0 mm; 90% of the coal had a particle size below 90μ.

The resulting mixture was shaped and pressed to form cylindrical bodies of 9 mm length and 9 mm diameter. These bodies were placed into a rotary furnace having an unobstructed interior (see FIG. 2) which was interiorly flushed with nitrogen gas. In the furnace these bodies were heated to 600° C. at a heating rate of 15° C./min. Thereafter, they were brought within 10 minutes to a final temperature of 900° C.

The resulting coke was analyzed and was found to have a residual volatile content of 1.8%. Ninety-one (91) percent of the resulting coke bodies had a diameter in excess of 6.3 mm. When the coke was used and circulated in a desulfurizing installation it was found to undergo abrasion of only 0.22% by weight per complete cycle (i.e. adsorption, desorption and recycling to adsorption).

EXAMPLE 2

A mixture was formed containing 150% by weight of peat coal and 50% by weight of hard pitch. This mixture was then press-molded to form shaped bodies having a diameter of 11 mm. These bodies were continuously fed through a rotary furnace whose axis of rotation was slightly inclined to the horizontal. In the furnace the bodies were heated to a temperature of about 650° C. at a heating rate of about 25° C./min and under exclusion of air; the interior of the furnace was free of any components such as baffles or the like. After reaching a temperature of about 650° C. the bodies were admitted into a second rotary furnace the interior of which contained the usual entraining baffles and were heated at a rate of about 40°–50° C./min to a final temperature of 850° C.

An analysis of the resulting coke showed it to contain 2.2% of volatiles. Eighty-eight (88) percent of the coke bodies had a diameter in excess of 9 min. When used and circulated in a desulfurizing installation the coke was found to undergo abrasion of only 0.4% per complete cycle.

EXAMPLE 3

A homogenous mixture was formed from 150% by weight of finely comminuted oxycoal (coal treated with oxygen at 220° C.) and of 70% by weight of a synthetic plastic binder. The binder consisted of 70% by weight of polypropylene and of 30% by weight of a mixed polymerizate composed of butadene and styrene. The mixture was then press-molded to make shaped bodies having a diameter of 12 mm.

These bodies were placed into a rotary furnace whose interior was unobstructed by mixing and entraining baffles, and were heated—under careful exclusion of air and at a rate of 10° C./min—to a temperature of 550° C. Thereafter, the temperature of the bodies was raised to 900° C. within 20 minutes.

An analysis of the resulting coke showed it to contain 1.1% of volatiles. Eighty-four (84) percent of the coke bodies had a diameter in excess of 12 mm. When used and circulated in a desulfurizing installation the coke was found to undergo abrasion of only 0.5% per complete cycle.

EXAMPLE 4

A homogenous mixture was formed from 150% by weight of powdered charcoal and of 80% by weight of hard pitch. The mixture was extruded from an extruder and converted into cylindrical shaped bodies having a diameter of 8 mm. These bodies were degassed in a first rotary furnace having an unobstructed interior, by heating them to a temperature of 600° C. at a rate of 30° C./min. Air was excluded from the furnace by flushing the same with nitrogen. The first furnace was rotated at 4 RPM. The bodies were then transferred into a second rotary furnace having interior entraining baffles and were heated, in the presence of air and at 8 RPM, to a final temperature of 950° C.

The resulting coke was analyzed and found to have a volatiles content of 0.6%. Ninety-two (92) percent of the coke bodies had a diameter in excess of 8 mm. When used and circulated in a desulfurizing installation to coke was found to undergo abrasion of only 0.3% per cycle.

EXAMPLE 5

A homogenous mixture was formed at a temperature of 70° C. from 150% by weight of peat-coke dust and from 50% by weight of soft pitch having a softening point of 52°–56° C. measured according to Kraemer-Sarnow. The mixture was press-molded to form shaped bodies having a diameter of 9 mm. These were then thermally treated in accordance with Example 1.

An analysis of the resulting coke showed it to contain a residual 1.4% of volatiles. Eighty-nine (89) percent of the coke bodies had a diameter in exess of 9 mm. Abrasion per cycle in a desulfurizing installation was found to be only 0.25%.

An important aspect of the invention, as seen in the following Table I, is that the abrasion-resistance of the produced coke increases concomitantly with a decrease in the oxygen content present in the furnace during degassing, and vice versa. The oxygen content is, of course, a measure for the intensity of flame formation during the combustion of the driven-off volatiles which is conventional in the art. The abrasion resistance is expressed in the Table in terms of percent abrasion per cycle (circulation) of the shaped coke in a desulfurizing installation holding a charge of 20 tons of coke:

TABLE I

| Oxygen Content in Furnace Atmosphere | Abrasion per Cycle in Desulfurizing Installation |
|---|---|
| 0.4 Vol.-% | 0.27% |
| 2.5 Vol.-% | 0.35% |
| 3.3 Vol.-% | 0.45% |
| 6.5 Vol.-% | 0.60% |
| 10.0 Vol.-% | 0.70% |
| 14.8 Vol.-% | 0.85% |

The hereafter following Table II shows how the undersize (i.e. diameter below the desired diameter) proportion of bodies increases in a charge of coke bodies having a diameter between 6.3–12 mm, which is being degassed under inert gas in a rotary furnace of 15 m length, as the number of mixing and entraining baffles distributed over the entire length of the furnace increases:

TABLE II

| Number of Baffles | Distance from Furnace Inlet in Meters | Undersize Bodies (below 6.3 mm) |
|---|---|---|
| 0 |  | 6–8 weight % |
| 2 | 5; 10 | 20 weight % |
| 4 | 2;5;7;10 | 32 weight % |
| 6 | 2;4;6;8;10;12 | 60 weight % |

It will be seen from the above that the present invention not only produces a harder, more abrasion-resistant (and hence higher-quality) shaped coke, but also that the percentage rate of bodies which become fractured and broken up during the degassing (and which then constitute undersize bodies) is substantially decreased as compared to the prior art where the degassing takes place during combustion of the driven-off volatiles in rotary furnaces which are provided with mixing and entraining baffles for the bodies that are being degassed.

While the invention has been illustrated and described as embodied in the manufacture of shaped coke bodies for the adsorption of sulfur oxides from waste (flue) gases, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention.

What is claimed as new and desired to be protected by Letters Patent is set forth in the appended claims.

1. A method of making abrasion-resistant shaped coke, particularly coke for use in adsorbing sulfur oxides from flue gases, comprising the steps of forming a mixture of particulate carbonaceous material and of between 5–35% by weight thereof of a binder for the material; converting the mixture into shaped bodies; introducing the shaped bodies into a rotary furnace having an unobstructed inner cross-section free of entraining elements; and outgassing the shaped bodies in the furnace at between about 500°–900° C. to convert them into coke bodies, the step of outgassing comprising heating the shaped bodies exclusively by heating the furnace at the exterior thereof, and flushing the interior of the furnace with an inert gas to produce in the interior an atmosphere containing at most 5% by volume of oxygen wherein the bodies are heated to a temperature of between about 500°–700° C. while preventing the ignition of the expelled gases and protecting the bodies against exposure to significant mechanical stresses.

2. A method as defined in claim 1, wherein all of the carbonaceous material a particle size smaller than 1.0 mm.

3. A method as defined in claim 1, wherein 90% of the particulate carbonaceous material has a particle size smaller than 90μ.

4. A method as defined in claim 1, wherein 80% of the particulate fuel has a particle size smaller than 60μ.

5. A method as defined in claim 1, wherein the binder is selected from the group consisting of bitumen, tar, pitch and synthetic plastics.

6. A method as defined in claim 1, wherein the furnace is rotated at between 1–6 rotations per minute.

7. A method as defined in claim 1, wherein the furnace is rotated at between 3–4 rotations per minute.

* * * * *